US010831404B2

(12) United States Patent
Li

(10) Patent No.: US 10,831,404 B2
(45) Date of Patent: Nov. 10, 2020

(54) METHOD AND SYSTEM FOR FACILITATING HIGH-CAPACITY SHARED MEMORY USING DIMM FROM RETIRED SERVERS

(71) Applicant: Alibaba Group Holding Limited, George Town, Grand Cayman (KY)

(72) Inventor: Shu Li, Bothell, WA (US)

(73) Assignee: Alibaba Group Holding Limited, George Town (KY)

(*) Notice: Subject to any disclaimer, the term of this patent is extended or adjusted under 35 U.S.C. 154(b) by 0 days.

(21) Appl. No.: 15/892,198

(22) Filed: Feb. 8, 2018

(65) Prior Publication Data
US 2019/0243579 A1 Aug. 8, 2019

(51) Int. Cl.
G06F 3/06 (2006.01)
(52) U.S. Cl.
CPC .......... *G06F 3/0659* (2013.01); *G06F 3/0611* (2013.01); *G06F 3/0673* (2013.01)
(58) Field of Classification Search
CPC .............................................. G06F 15/17331
See application file for complete search history.

(56) References Cited

U.S. PATENT DOCUMENTS

| 4,775,932 A | 10/1988 | Oxley |
| 5,930,167 A | 7/1999 | Lee |
| 6,148,377 A | 11/2000 | Carter |
| 6,226,650 B1 | 5/2001 | Mahajan et al. |
| 6,243,795 B1 | 6/2001 | Yang |
| 7,351,072 B2* | 4/2008 | Muff .................. G11C 5/04 228/180.21 |
| 7,565,454 B2 | 7/2009 | Zuberi |
| 7,958,433 B1 | 6/2011 | Yoon |
| 8,085,569 B2 | 12/2011 | Kim |

(Continued)

FOREIGN PATENT DOCUMENTS

| WO | 9418634 | 8/1994 |
| WO | 1994018634 | 8/1994 |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Edward J Dudek, Jr.
(74) *Attorney, Agent, or Firm* — Shun Yao; Park, Vaughan, Fleming & Dowler LLP

(57) ABSTRACT

One embodiment facilitates a shared memory. During operation, the system receives, by a memory expansion device, an I/O request via a first interface which is distinct from a memory bus, wherein the memory expansion device includes a first set of memory modules, and wherein the memory expansion device is attached to a computer system via the first interface. The system processes, by a controller of the memory expansion device, the I/O request. The system transmits, by the controller via a second interface, the I/O request to a selected memory module. The system executes, by the selected memory module, the I/O request, thereby allowing the computer system to expand memory capacity beyond memory slots available on the memory bus.

20 Claims, 11 Drawing Sheets

(56) References Cited

U.S. PATENT DOCUMENTS

| | | |
|---|---|---|
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,751,763 B1 | 6/2014 | Ramarao |
| 8,825,937 B2 | 9/2014 | Atkisson |
| 8,949,208 B1 | 2/2015 | Xu |
| 9,043,545 B2 | 5/2015 | Kimmel |
| 9,088,300 B1 | 7/2015 | Chen |
| 9,092,223 B1 | 7/2015 | Pani |
| 9,280,472 B1 | 3/2016 | Dang |
| 9,280,487 B2 | 3/2016 | Candelaria |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 10,013,169 B2 | 7/2018 | Fisher |
| 10,229,735 B1 | 3/2019 | Natarajan |
| 10,235,198 B2 | 3/2019 | Qiu |
| 2002/0010783 A1 | 1/2002 | Primak |
| 2002/0073358 A1 | 6/2002 | Atkinson |
| 2002/0161890 A1 | 10/2002 | Chen |
| 2003/0074319 A1 | 4/2003 | Jaquette |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0103238 A1 | 5/2004 | Avraham |
| 2004/0143718 A1* | 7/2004 | Chen ................ G06F 11/1666 711/202 |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0065805 A1* | 3/2008 | Wu ................ G06F 1/186 710/301 |
| 2008/0082731 A1* | 4/2008 | Karamcheti ........ G06F 12/0638 711/103 |
| 2008/0112238 A1 | 5/2008 | Kim |
| 2008/0301532 A1 | 12/2008 | Uchikawa |
| 2009/0113219 A1 | 4/2009 | Aharonov |
| 2009/0282275 A1 | 11/2009 | Yermalayeu |
| 2009/0307249 A1 | 12/2009 | Koifman |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |
| 2011/0055458 A1 | 3/2011 | Kuehne |
| 2011/0055471 A1 | 3/2011 | Thatcher |
| 2011/0072204 A1* | 3/2011 | Chang ................ G06F 12/0284 711/103 |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0292538 A1 | 12/2011 | Haga |
| 2011/0299317 A1 | 12/2011 | Shaeffer |
| 2011/0302353 A1 | 12/2011 | Confalonieri |
| 2012/0039117 A1 | 2/2012 | Webb |
| 2012/0084523 A1 | 4/2012 | Littlefield |
| 2012/0117399 A1 | 5/2012 | Chan |
| 2012/0147021 A1 | 6/2012 | Cheng |
| 2012/0159289 A1 | 6/2012 | Piccirillo |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2013/0013880 A1 | 1/2013 | Tashiro |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0318283 A1 | 11/2013 | Small |
| 2013/0318395 A1 | 11/2013 | Kalavade |
| 2014/0019650 A1 | 1/2014 | Li |
| 2014/0082273 A1 | 3/2014 | Segev |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0142752 A1 | 5/2015 | Chennamsetty |
| 2015/0227316 A1 | 8/2015 | Warfield |
| 2015/0277937 A1 | 10/2015 | Swanson |
| 2015/0301964 A1 | 10/2015 | Brinicombe |
| 2015/0304108 A1 | 10/2015 | Obukhov |
| 2015/0363271 A1 | 12/2015 | Haustein |
| 2015/0372597 A1 | 12/2015 | Luo |
| 2016/0014039 A1 | 1/2016 | Reddy |
| 2016/0026575 A1 | 1/2016 | Samanta |
| 2016/0048341 A1 | 2/2016 | Constantinescu |
| 2016/0098344 A1 | 4/2016 | Gorobets |
| 2016/0110254 A1 | 4/2016 | Cronie |
| 2016/0162187 A1 | 6/2016 | Lee |
| 2016/0179399 A1 | 6/2016 | Melik-Martirosian |
| 2016/0188890 A1 | 6/2016 | Naeimi |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0212708 A1 | 7/2017 | Suhas |
| 2017/0228157 A1 | 8/2017 | Yang |
| 2017/0249162 A1 | 8/2017 | Tsirkin |

(56) References Cited

U.S. PATENT DOCUMENTS

| | | |
|---|---|---|
| 2017/0262178 A1 | 9/2017 | Hashimoto |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0088867 A1 | 3/2018 | Kaminaga |
| 2018/0107591 A1 | 4/2018 | Smith |
| 2018/0143780 A1 | 5/2018 | Cho |
| 2018/0150640 A1 | 5/2018 | Li |
| 2018/0167268 A1 | 6/2018 | Liguori |
| 2018/0189182 A1 | 7/2018 | Wang |
| 2018/0212951 A1 | 7/2018 | Goodrum |
| 2018/0270110 A1 | 9/2018 | Chugtu |
| 2018/0293014 A1 | 10/2018 | Ravimohan |
| 2018/0329776 A1 | 11/2018 | Lai |
| 2018/0349396 A1 | 12/2018 | Blagojevic |
| 2018/0356992 A1 | 12/2018 | Lamberts |
| 2018/0373428 A1 | 12/2018 | Kan |
| 2018/0373664 A1* | 12/2018 | Vijayrao ............. G06F 13/4022 |
| 2019/0012111 A1 | 1/2019 | Li |
| 2019/0073262 A1 | 3/2019 | Chen |
| 2019/0205206 A1* | 7/2019 | Hornung ............. G06F 11/1016 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

* cited by examiner

METHOD AND SYSTEM FOR FACILITATING HIGH-CAPACITY SHARED MEMORY USING DIMM FROM RETIRED SERVERS

BACKGROUND

Field

This disclosure is generally related to the field of data storage. More specifically, this disclosure is related to a method and system for facilitating a high-capacity shared memory layer using volatile memory modules (e.g., dual in-line memory modules or DIMMs) from a retired server.

Related Art

The proliferation of the Internet and e-commerce continues to create a vast amount of digital content. Various storage systems and servers have been created to access and store such digital content. A storage system or server can include volatile memory (e.g., dynamic random access memory (DRAM)) and multiple drives (e.g., a solid state drive (SSD)), where a drive can include non-volatile memory for persistent storage (e.g., NAND flash). The memory in a server plays a crucial role in the performance and capacity of a storage system. For example, as current applications require an increasing amount of memory, the read latency becomes an important feature. In current storage systems, the read cache is implemented in the system memory, similar to the page cache, and thus shares the overall system memory resources with other applications and processes. This may result in a conflict between the read cache and other memory allocation requests related to the system memory space. Because current applications are increasingly memory-hungry, the utilization of the system memory may create a bottleneck in the overall performance of the system.

In addition, the amount of memory in the server (e.g., DRAM) can limit the overall performance of the system. For example, a single central processing unit (CPU) socket can only support a limited number of dual in-line memory module (DIMM) slots, and a single DIMM has a limited capacity. Even if DIMMs are added to the server to increase the storage capacity, the high cost of DIMMs can affect the total cost of ownership (TCO).

Furthermore, servers in a storage system may be periodically upgraded to meet the increasing needs of memory-hungry applications. When a server is "retired" and upgraded to a new server (e.g., with technologically improved volatile memory modules such as DDR4 DIMM), the retired server still includes functioning volatile memory modules (e.g., DDR3 DIMMs).

Thus, the limited capacity of memory in a server, along with the server upgrades which result in retired and unused DIMMs, may create a bottleneck in the performance of the server, and may also create challenges for a reduced TCO in light of the increasing scale of data centers.

SUMMARY

One embodiment facilitates a shared memory. During operation, the system receives, by a memory expansion device, an I/O request via a first interface which is distinct from a memory bus, wherein the memory expansion device includes a first set of memory modules, and wherein the memory expansion device is attached to a computer system via the first interface. The system processes, by a controller of the memory expansion device, the I/O request. The system transmits, by the controller via a second interface, the I/O request to a selected memory module. The system executes, by the selected memory module, the I/O request, thereby allowing the computer system to expand memory capacity beyond memory slots available on the memory bus.

In some embodiments, the system selects, by the controller, the memory module to which the I/O request is to be transmitted.

In some embodiments, processing the I/O request further comprises one or more of: performing a cyclic redundancy check on data associated with the I/O request; determining a placement for the data associated with the I/O request; performing a management procedure for the data associated with the I/O request or for the first set of memory modules; and performing an error correction code encoding or decoding on the data associated with the I/O request.

In some embodiments, the first interface is a Peripheral Component Interconnect Express (PCIe) interface between a requesting host and the controller, and the second interface is a dynamic random access memory (DRAM) dual in-line memory module (DIMM) interface between the controller and the memory modules.

In some embodiments, the memory expansion device is coupled to a computing device which includes: a set of ports; a second set of memory modules; a set of controllers for the second set of memory modules; a set of microprocessors; a switch; and a set of lanes.

In some embodiments, prior to the memory expansion device receiving the I/O request, the system: receives, by the computing device via a port, the I/O request; determines, by a microprocessor of the computing device, that the I/O request is to be processed by the memory expansion device; and transmits, via the switch and a selected lane, the I/O request to the memory expansion device to be executed by the memory expansion device.

In some embodiments, the memory expansion device is one of a plurality of memory expansion devices attached to or coupled to the computing device.

In some embodiments, the system receives, by the computing device via a port, a second I/O request. The system determines, by a microprocessor of the computing device, that the second I/O request is to be processed by a memory module of the second set. The system executes, by the memory module of the second set, the second I/O request.

BRIEF DESCRIPTION OF THE FIGURES

In the figures, like reference numerals refer to the same figure elements.

DETAILED DESCRIPTION

Figure 1:
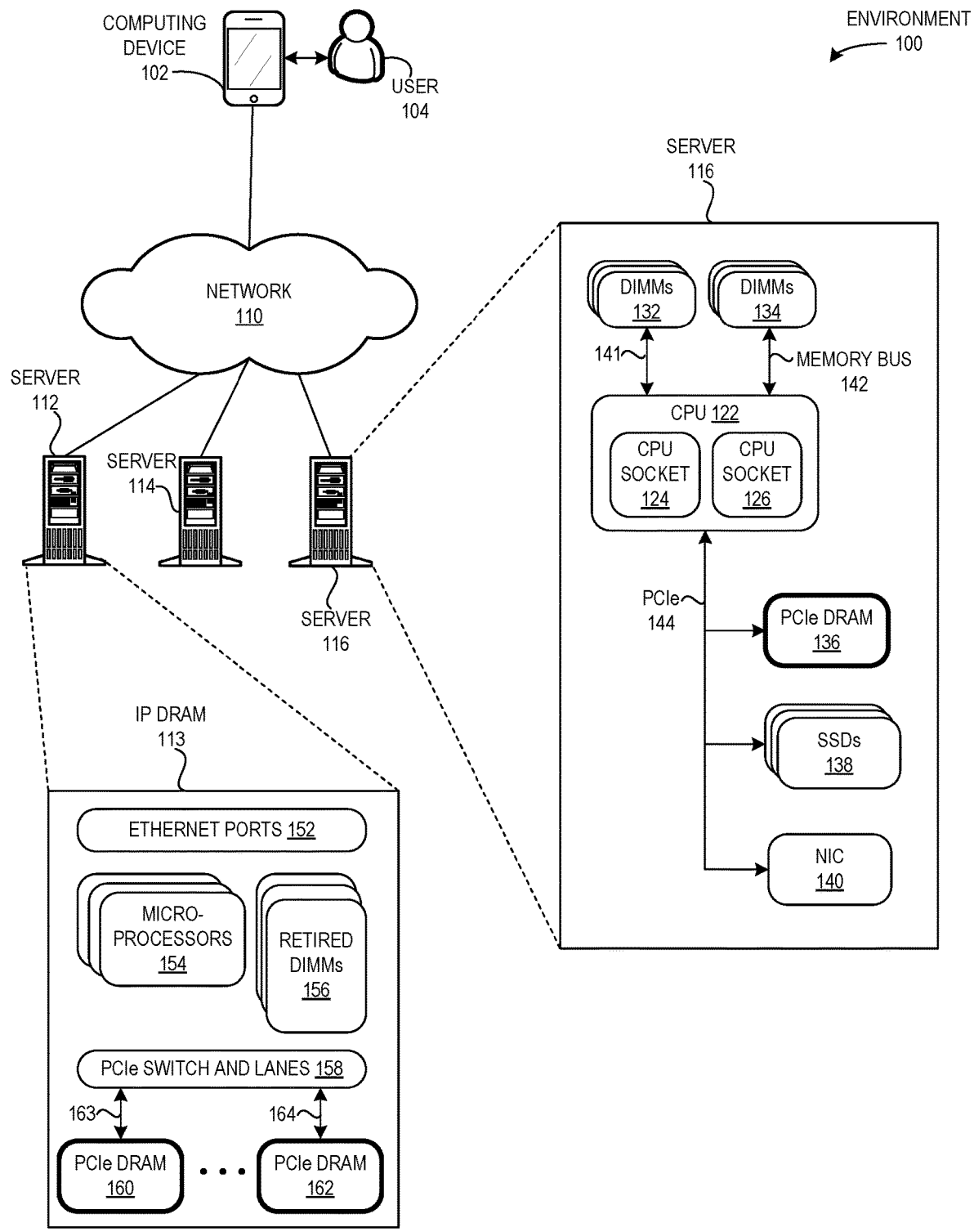
FIG. 1 illustrates an exemplary environment that facilitates a shared memory, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of the performance bottleneck resulting from limited memory in a server (e.g., DRAM) by creating a shared memory layer in a pluggable or attachable memory expansion device which uses DIMMs from retired servers. As today's applications require an increasing amount of memory, the utilization of system memory by the read cache can create conflicts with other memory allocation requests related to the system memory space, which can result in a performance bottleneck. The amount of available volatile memory (e.g., DRAM) can limit the overall performance of the system, as a single CPU can only support a limited number of DIMMs, and a single DIMM has a limited capacity.

Furthermore, as servers are periodically "retired" and upgraded to new servers with new volatile memory, the "retired" DIMMs (which are still operational) are left unused. The increasing memory-hungry needs of current applications result in the increasing scale of data centers, which can accelerate the pace of server retirement and upgrading. The accelerated pace of server retirement along with the high cost of DIMMs can increase the total cost of ownership (TCO) (e.g., having to purchase more DIMMs more frequently).

Because the maximum number of DIMMs supported by a single CPU socket is limited by the CPU itself, there is limited space to increase the system memory through the memory bus (e.g., by adding additional DIMMS). In contrast, the PCIe bus can be used as a general-purpose standard interface for various devices, including SSDs, host bus adapter (HBA) cards, and network interface cards, etc. The embodiments described herein address the above-mentioned challenges by providing a system which places retired DIMMS into a PCIe memory expansion device, which can be accessed by both local servers and remote servers. This memory expansion device is referred to in this disclosure as a "PCIe DRAM." The PCIe DRAM includes: a first PCIe interface (between a host and a controller); the controller; a second DRAM DIMM interface (between the controller and the DRAM); and multiple DRAM DIMM slots in which to plug in the DIMMs from retired servers ("retired DIMMS"). This memory expansion device can be plugged into, attached to, fixed to, or coupled to a computer system via the first PCIe interface. Furthermore, this memory expansion device can be accessed by a local server (as in a PCIe DRAM, described below in relation to FIG. 4) or by a remote server (as in an "IP DRAM," described below in relation to FIGS. 5A and 5B).

Thus, the embodiments described herein provide a system which improves the efficiency and performance of a storage system. By placing the retired DIMMS into a memory expansion device and utilizing the PCIe bus, the system provides a technological solution to the problem of a performance bottleneck by allowing the storage system to expand memory capacity beyond memory slots available on the memory bus. Both the PCIe DRAM and the IP DRAM systems described herein may be implemented as plug-and-play modules which are compatible with existing rack/server deployments in a data center or storage system. Thus, the system can avoid the bottleneck created by limited DRAM capacity, and can further defray costs incurred from upgrading servers and discarding retired DIMMs.

Exemplary Environment and Network

FIG. 1 illustrates an exemplary environment that facilitates a shared memory, in accordance with an embodiment of the present application. Environment 100 can include a computing device 102 and an associated user 104. Computing device 102 can communicate via a network 110 with storage servers 112, 114, and 116, which can be part of a distributed storage system and accessed via client servers (not shown). A storage server can include volatile memory and multiple components or devices. For example, server 116 can include a CPU 122 with two CPU sockets 124 and 126, which communicate via a memory bus 141 with DIMMs 132 and via a memory bus 142 with DIMMs 134. Server 116 can also include components, such as: a PCIe DRAM 136 (depicted with a thick black outline); solid state drives (SSDs) 138; and a network interface card (NIC) 140. CPU 122 can communicate with these components via a PCIe bus 144. An exemplary architecture for a PCIe DRAM (e.g., PCIe DRAM 136) is described below in relation to FIG. 4.

Furthermore, a server in environment 100 can include a PCIe DRAM that is accessible based on a remote input/output (I/O) communication. For example, server 112 can include an IP DRAM 113, which includes Ethernet ports 152, microprocessors 154, retired DIMMs 156, and a PCIe switch and lanes 158, which can communicate with PCIe DRAMs 160 and 162 via communications 163 and 164 over a PCIe bus. An exemplary architecture for an Ethernet-addressable PCIe DRAM (e.g., IP DRAM 113) is described below in relation to FIG. 5A.

Specifically, servers 112-116 can be part of a plurality of servers in a data center rack. A server may be periodically retired and upgraded, e.g., replaced with a new server which has faster, newer technology and components, including new DIMMs. In such a case, the retired server still has DIMMs ("retired DIMMS") which are operational. Recall that DIMMs may be expensive, so simply discarding the retired DIMMs may incur an increased TCO, which is neither ideal nor efficient. In the embodiments described herein, the retired DIMMs may be plugged into a PCIe DRAM, and accessed via a private PCIe interface, a controller, and a private DRAM DIMM interface.

For example, when a server is to be retired, its retired DIMMs may be plugged into a memory expansion device (e.g., PCIe DRAM 136), and accessed locally (via PCIe bus 144, as described below in relation to FIG. 4). In addition, the retired DIMMs may be plugged into Ethernet-addressable PCIe DRAMs 160 and 162, and accessed remotely (via Ethernet ports 152, as described below in relation to FIG. 5). Note that retired DIMMs 156 depicted in IP DRAM 113 may be DIMMs from a retired server and which have been plugged into IP DRAM 113.

Thus, embodiments of the present invention provide a system which uses DIMMs which are to be retired, by placing these "retired DIMMS" directly into a memory expansion device (PCIe DRAM), and accessing the retired DIMMs via a controller and two private interfaces, either locally or remotely. While accessing these retired DIMMs in this manner over the PCIe bus may incur a higher latency than accessing DRAM DIMM over a memory bus, the system still incurs a lower latency than using an SSD. Furthermore, because the memory access is more consistent, the performance may be more constant. Thus, by using the retired DIMMs in this manner, the PCIe DRAMs can enlarge the memory capacity of a server (e.g., a new server which replaces a retired server) and increase the efficiency of the system.

Memory-Hungry Applications Limited by Updated Hardware

Figure 2A:
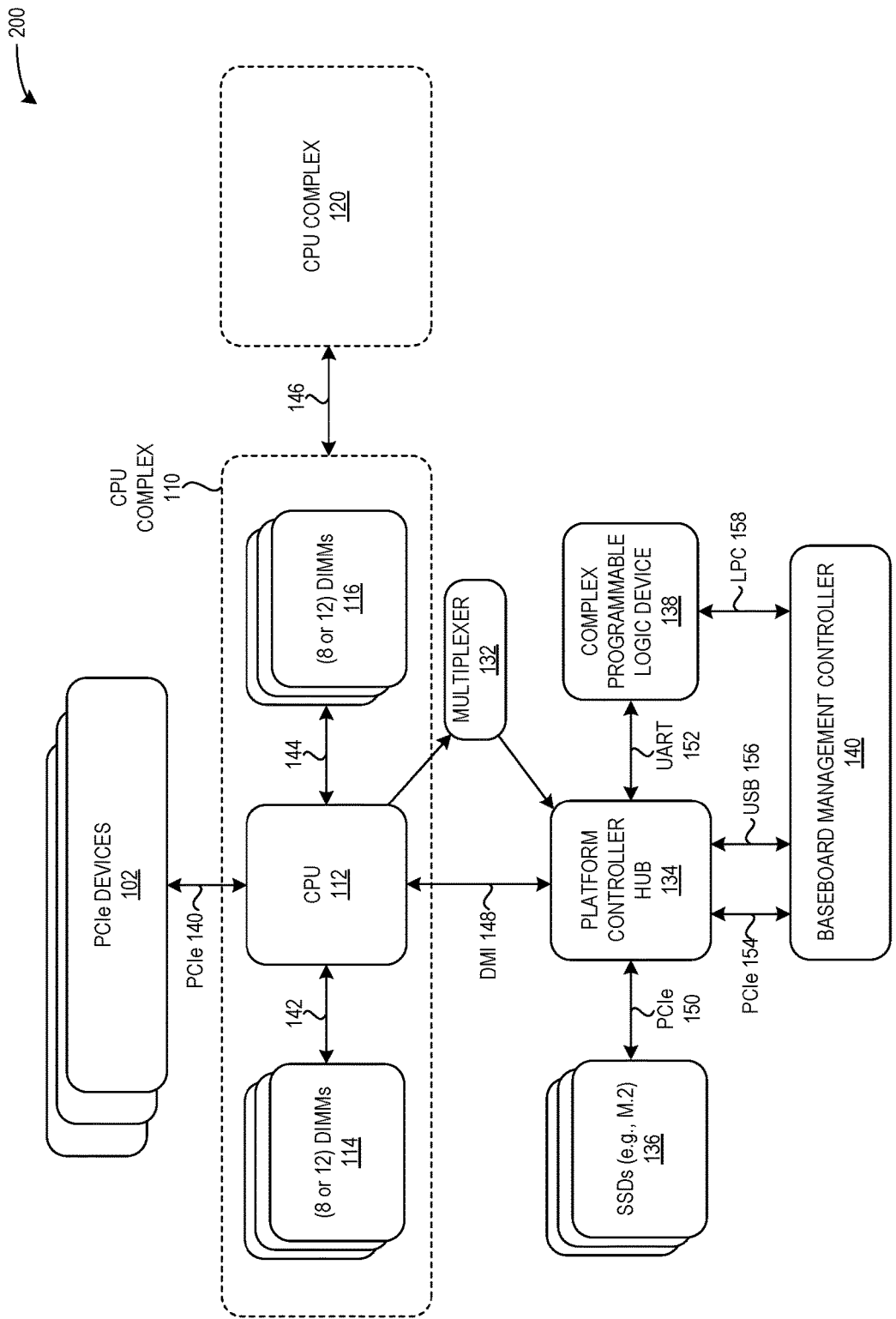
FIG. 2A illustrates an exemplary architecture of a server, in accordance with the prior art.

FIG. 2A illustrates an exemplary architecture of a server 200, in accordance with the prior art. Server 200 can include multiple CPU complexes (e.g., 110 and 120). CPU complex 110 can include a CPU 112, which communicates via a memory bus 142 with (8 or 12) DIMMs 114 and via a memory bus 144 with (8 or 12) DIMMs 116. CPU 112 can also communicate with various PCIe devices 102 via a PCIe bus 140, and with a platform controller hub (PCH) 134 via a direct media interface (DMI) 148. PCIe devices 102 can include a NIC, an SSD, a hard disk drive (HDD), and a general processing unit (GPU). CPU 112 can also communicate with PCH 134 via a multiplexer 132. PCH 134 can communicate with various SSDs (e.g., M.2) 136 via a PCIe protocol 150, and with a complex programmable logic device (CPLD) 138 via a universal asynchronous receiver/transmitter (UART) protocol 152. PCH 134 can further communicate with a baseboard management controller (BMC) 140 via both a PCIe protocol 154 and a universal serial bus (USB) protocol 156. CPLD 138 can communicate with BMC 140 via a low pin count (LPC) bus 158.

As the number of DIMMs supported by a single CPU socket continues to increase over time, the fabrication technology for DIMMs continues to scale down, e.g., increasing capacity while maintaining size, such as from 8 GB to 16 GB to 32 GB to 64 GB. While the number of DIMM slots and the capacity of a single DIMM both continue to increase, this hardware upgrading still cannot provide sufficient memory (and sufficiently fast latency for memory access) for memory-hungry applications.

Figure 2B:
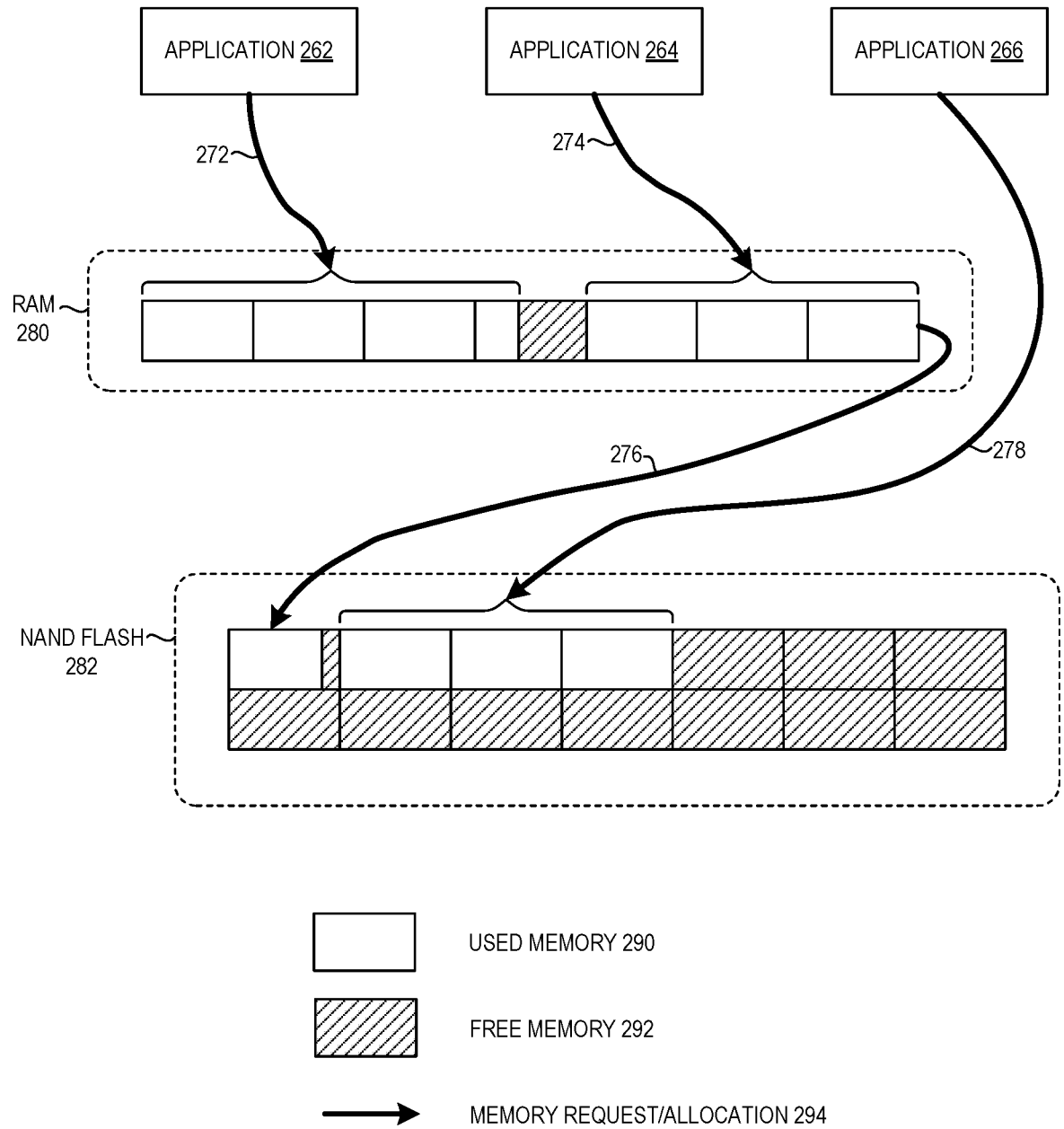
FIG. 2B illustrates an exemplary virtual memory allocation.

One solution to meet the memory needs of current applications is to extend the memory space by using a virtual memory method based on storage space from an SSD or an HDD. FIG. 2B illustrates an exemplary virtual memory allocation. Used memory is indicated by blank boxes (e.g., used memory 290), and free or available memory is indicated by diagonally striped lines (e.g., free memory 292). A memory request/allocation is indicated by a thick line (e.g., 294). Different applications (e.g., applications 262, 264, and 266) may initiate a request for memory, which can cause the system to allocate a certain amount of memory in the volatile memory (e.g., RAM 280) of the server. When there is no longer sufficient space in volatile memory, the system can allocate memory in the non-volatile memory (e.g., NAND flash 282) of the drive. For example, application 262 can send a request 272, which results in a memory allocation and data being stored in RAM 280. Application 264 can send a request 274, which results in a memory allocation and some data being stored in RAM 280 and the remainder of the data from application 264 stored in NAND flash 282 (via a request 276). Application 266 can send a request 278, which results in a memory allocation and all of the data from application 266 being stored in NAND flash 282.

However, the latency involved in writing data to an SSD (e.g., the physical media of NAND flash 282) can be approximately three to four times greater than the latency involved in writing data to the DRAM (e.g., RAM 280). This performance degradation may make the virtual memory solution not feasible or unable to work in a timing-critical application. Furthermore, because an SSD may not be as stable as DRAM, some I/O operations are likely to experience a significantly longer latency.

Figure 3A:
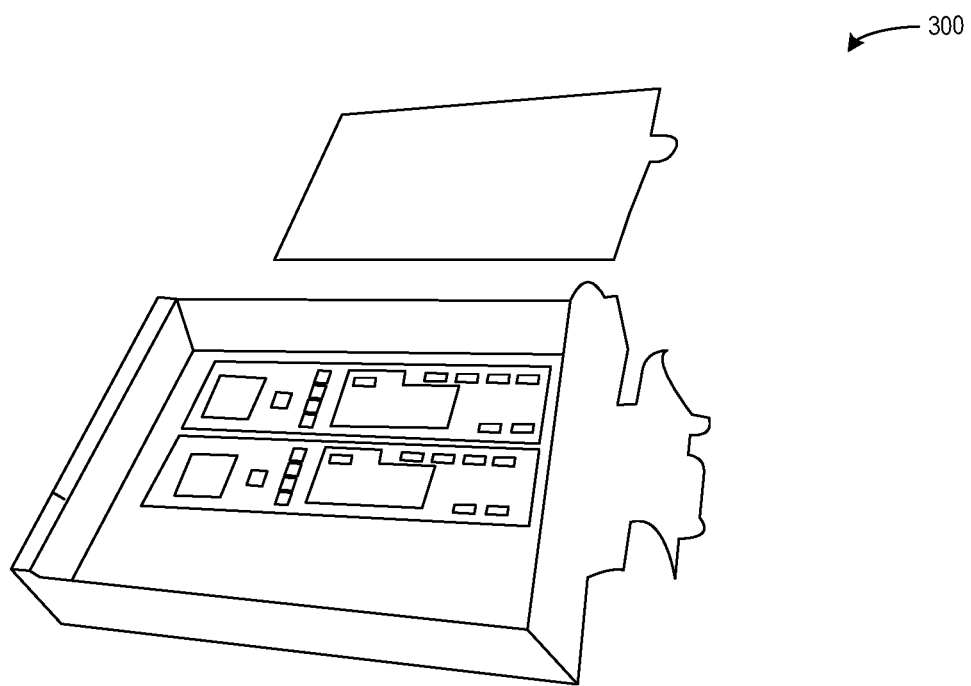
FIG. 3A illustrates an exemplary memory expansion device that facilitates a shared memory, based on a U.2 form factor, in accordance with an embodiment of the present application.

Exemplary Memory Expansion Devices for Facilitating a Shared Memory Layer; Local PCIe DRAM; and Ethernet-Addressable PCIe DRAM FIG. 3A illustrates an exemplary device 300 that facilitates a shared memory, based on a U.2 form factor, in accordance with an embodiment of the present application. Device 300 can be a PCIe DRAM, which is designed in the U.2 form factor. The retired DIMMs (from a retired server) can be simply installed directly into the PCIe DRAM module case. Device 300 can include a PCIe interface to connect with the server as well as a DIMM interface to install and communicate with the retired DRAM DIMMs. Device 300 can also include a printed circuit board (PCB) with the designed controller and circuits. The PCB may also be referred to as the "mid-plane" of the PCIe DRAM module.

Figure 3B:
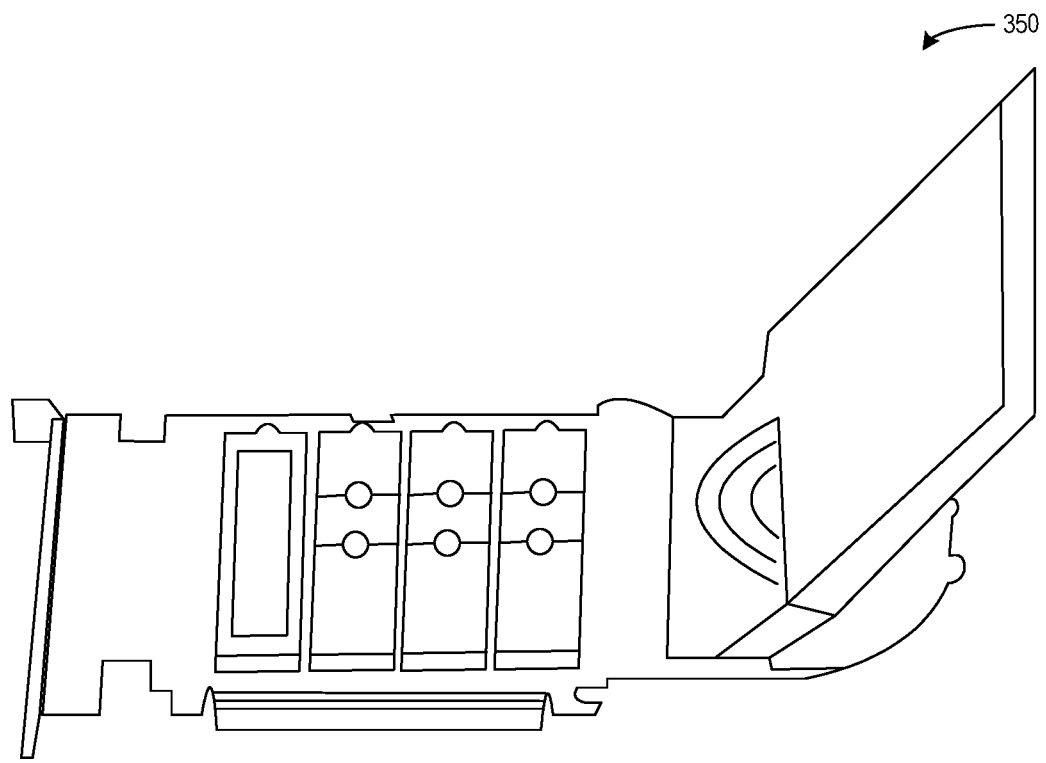
FIG. 3B illustrates an exemplary memory expansion device that facilitates a shared memory, based on an add-in card (AIC) form factor, in accordance with an embodiment of the present application.

FIG. 3B illustrates an exemplary device 350 that facilitates a shared memory, based on an add-in card (AIC) form factor, in accordance with an embodiment of the present application. Similar to device 300, device 350 can be a PCIe DRAM, which is designed in the AIC form factor. Device 350 can also have a PCIe interface, a DIMM interface, and a PCB (e.g., mid-plane) with the designed controller and circuits.

Figure 4:
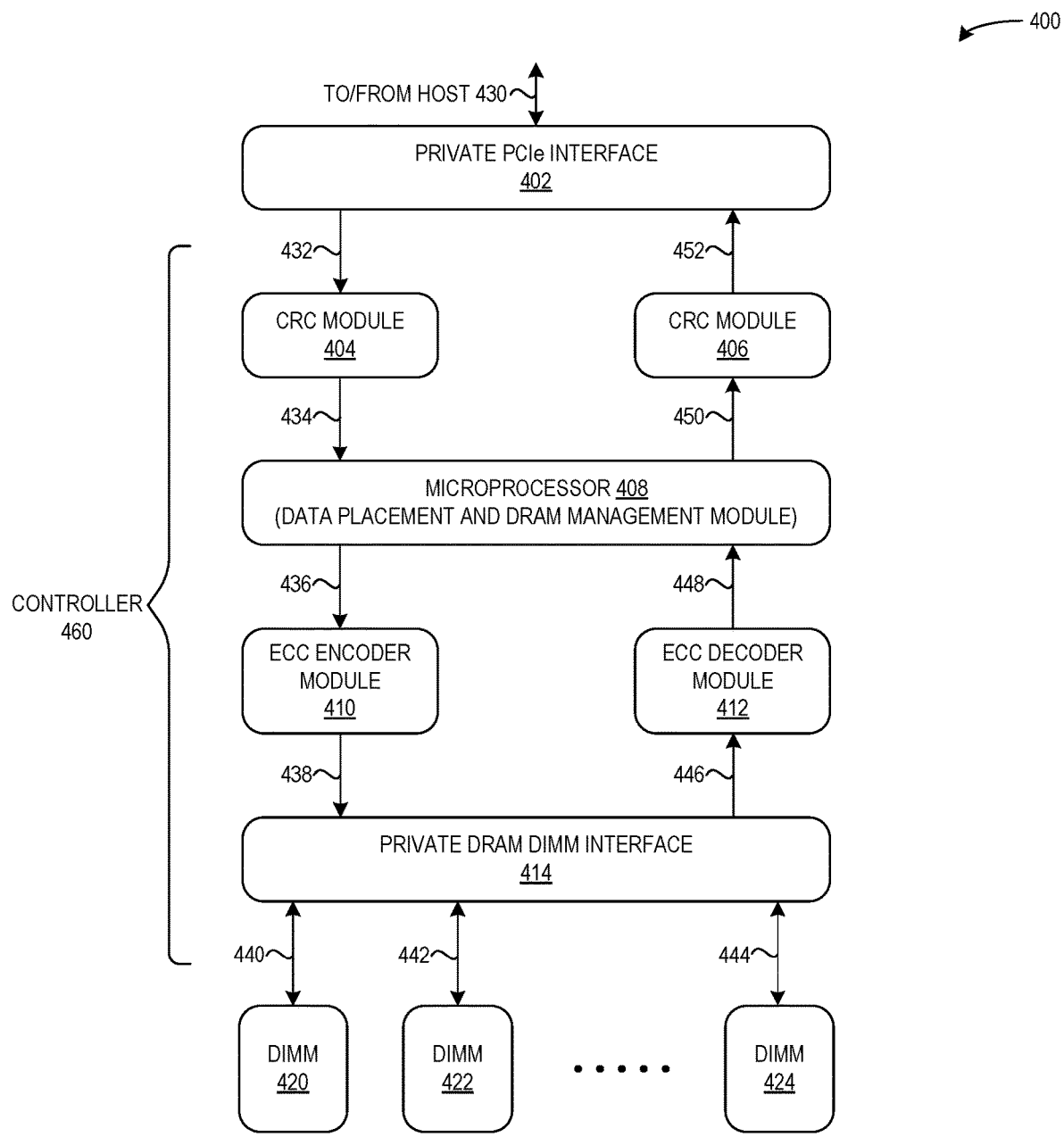
FIG. 4 illustrates an exemplary architecture of a memory expansion device that facilitates a shared memory, including a controller, in accordance with an embodiment of the present application.

FIG. 4 illustrates an exemplary architecture of a memory expansion device 400 that facilitates a shared memory, including a controller 460, in accordance with an embodiment of the present application. Memory expansion device 400 can include two separate interfaces: a private PCIe interface 402 which handles the translation of data from the host to the PCIe DRAM (i.e., the memory expansion device); and a private DRAM DIMM interface 414 which handles the translation of the processed data from a controller 460 to a set of volatile memory modules (e.g., DIMMs 420, 422, and 424). The volatile memory modules may be DIMMs from retired servers. Memory expansion device 400 can also include control circuitry (e.g., controller 460), which processes data by refreshing data, tracking errors, placing the data, and performing other DRAM management procedures.

During operation, memory expansion device 400 can receive and transmit data from/to (e.g., communicate with) a host 430 via private PCIe interface 402. Interface 402 can be based on the standard PCIe protocol, and can further include its own driver to handle memory mapping and data packet generation. The data may be passed to a CRC module 404 via a communication 432. CRC module 404 can perform a cyclic redundancy check to ensure that the data is correct. CRC module 404 can pass the checked data, along with the CRC signature, to a microprocessor 408 via a communication 434. Microprocessor 408 can perform data placement and DRAM management. Microprocessor 408 can send the data via a communication 436 to an ECC encoder module 410, which can perform an error correction code encoding on the data. ECC encoder module 410 can send the ECC-encoded data via a communication 438 to a specific DIMM through private DRAM DIMM interface 414 (e.g., via a communication 440 to DIMM 420, via a communication 442 to DIMM 422, and via a communication 444 to DIMM 424).

ECC encoder module 410 can use a medium-strength error correction code that is stronger than a hamming code but with a low latency overhead, such as a Bose-Chaudhuri-Hocquenghem (BCH) code. In contrast with the hamming code used in a conventional DRAM DIMM, the BCH code can be more powerful in mitigating the uncorrectable error rate which may directly cause a server reset. Because the PCIe DRAM is accessed via a PCIe bus, the latency overhead incurred from BCH decoding does not affect the critical path. At the same time, the BCH code can improve the fault tolerance of DRAM and can further extend the lifespan of the retired DRAM DIMMs. The BCH codeword may be divided into a form suitable for memory access (e.g., 72 bits) and sent to the DRAM DIMM in parallel (as shown by communications 440, 442, and 444 of FIG. 4).

On the return path, ECC-encoded data may be passed from, e.g., DIMM 424 via communication 444 through private DRAM DIMM interface 414 to an ECC decoder module 412 via a communication 446. ECC decoder module 412 can perform an error correction code decoding on the ECC-encoded data (e.g., based on the BCH code) and pass the decoded data to microprocessor 408 via a communication 448. Microprocessor 408 can perform DRAM management (e.g., update a data structure or other system files as appropriate) and send the decoded data to CRC module 406 via a communication 450. CRC module 406 can perform a cyclic redundancy check, and pass the checked data through private PCIe interface 402 via communications 452 and 430. Note that CRC modules 404 and 406 are depicted as separate modules for the sake of illustration, and can also be part of a single CRC module. Similarly, ECC encoder module 410 and ECC decoder module 412 are depicted as separate modules for the sake of illustration, and can also be part of a single ECC encoder/decoder module.

Data associated with an I/O request travels on a path through the CRC comparison (e.g., CRC modules 404/406), the firmware (microprocessor 408), and the medium-strength ECC encoding/decoding (e.g., ECC encoder/decoder modules 410/412). A host application can thus utilize a shared memory via the logical memory space, which is mapped to the physical pages of the retired DRAM DIMMs by the controller (e.g., controller 460).

Figure 5A:
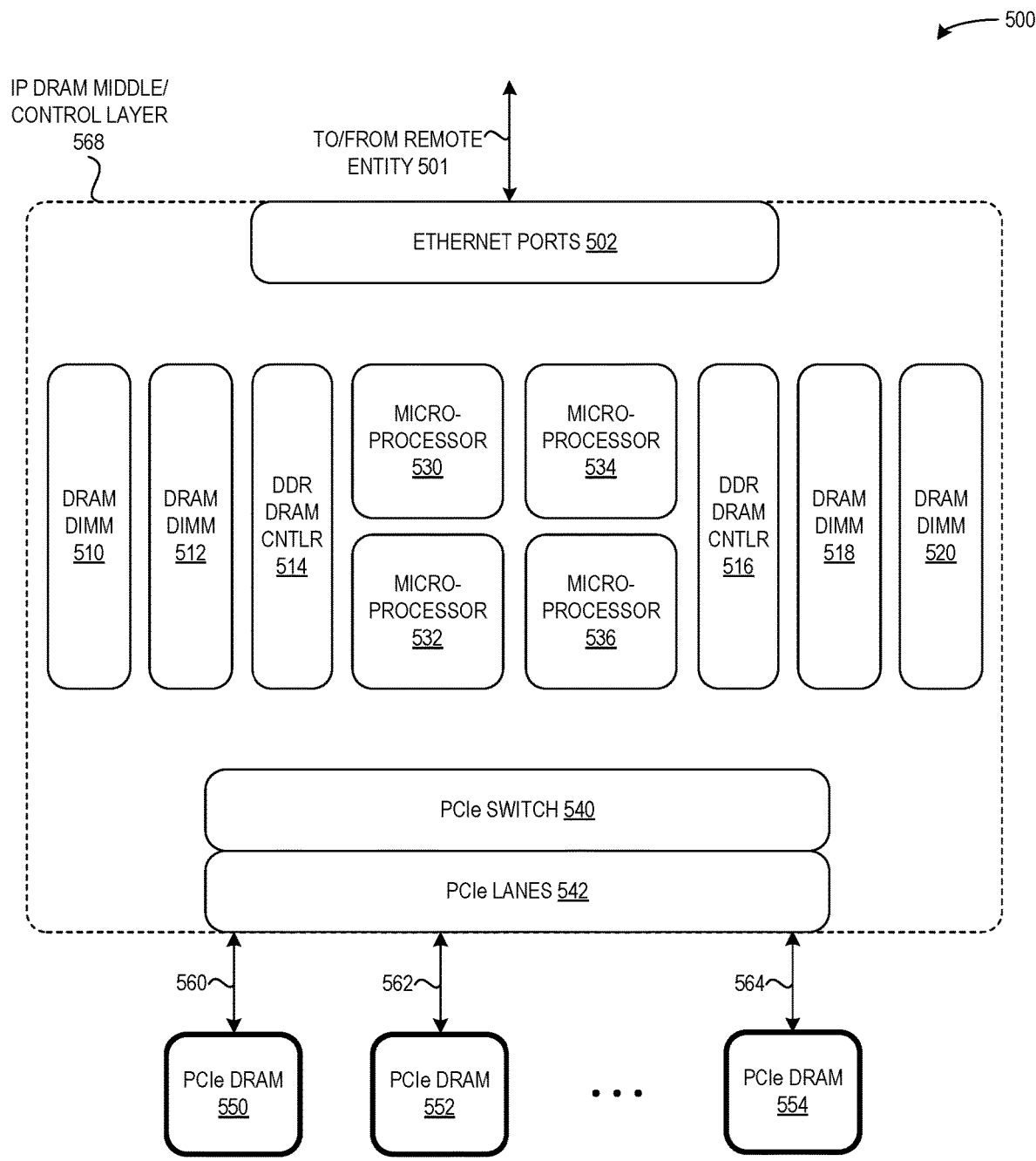
FIG. 5A illustrates an exemplary architecture of an Ethernet-addresssable memory expansion device that facilitates a shared memory, in accordance with an embodiment of the present application.

FIG. 5A illustrates an exemplary architecture of an Ethernet-addressable memory expansion device 500 that facilitates a shared memory, in accordance with an embodiment of the present application. Memory expansion device 500 can include an IP DRAM middle/control layer 568 which communicates with multiple PCIe DRAMs (e.g., PCIe DRAMs 550, 552, and 554, each of which can correspond to PCIe DRAM 400 as described above in relation to FIG. 4). IP DRAM middle/control layer 568 can include Ethernet ports 502, which can be parallel high-speed Ethernet ports, running at 4×25 GB. IP DRAM middle/control layer 568 can also include: microprocessors 530, 532, 534, and 536; a DDR DRAM controller 514, which controls DRAM DIMMs 510 and 512; and a DDR DRAM controller 516, which controls DRAM DIMMs 518 and 520 (via, e.g., a memory bus (not shown)). IP DRAM middle/control layer 568 can also include a PCIe switch 540 and multiple PCIe lanes 542.

Microprocessors 530-536 can process the (data) traffic and perform the protocol translation between Ethernet and PCIe. The microprocessors can perform computations needed to process incoming I/O requests. Because the microprocessors are mainly used for the protocol translation, the microprocessors are generally much weaker than a general-purpose CPU.

During operation, memory expansion device 500 can receive and transmit data from/to (e.g., communicate with) a remote entity 501 via Ethernet ports 502. The embodiments described herein can instantiate multiple PCIe DRAMs within Ethernet-addressable memory expansion device 500 in parallel in order to consume the extended PCIe lanes 542. In some embodiments, IP DRAM middle/control layer 568 can receive an I/O request via Ethernet ports 502, and one of microprocessors 530-536 can determine that the I/O request is to be processed by one of DRAM DIMMs 510 and 512 (via a communication with DDR DRAM controller 514), or by one of DRAM DIMMs 518 and 520 (via a communication with DDR DRAM controller 516). In other embodiments, IP DRAM middle/control layer 568 can determine that the I/O request is to processed by one of the coupled PCIe DRAM devices (e.g., PCIe DRAMs 550, 552, and 554), and transmit, via PCIe switch 540 and a selected lane of PCIe lanes 542, the I/O request to the respective memory expansion device to be executed by the respective memory expansion device. Note that DRAM DIMMs 510, 512, 518, and 520 can be DIMMs from a retired server.

Figure 5B:
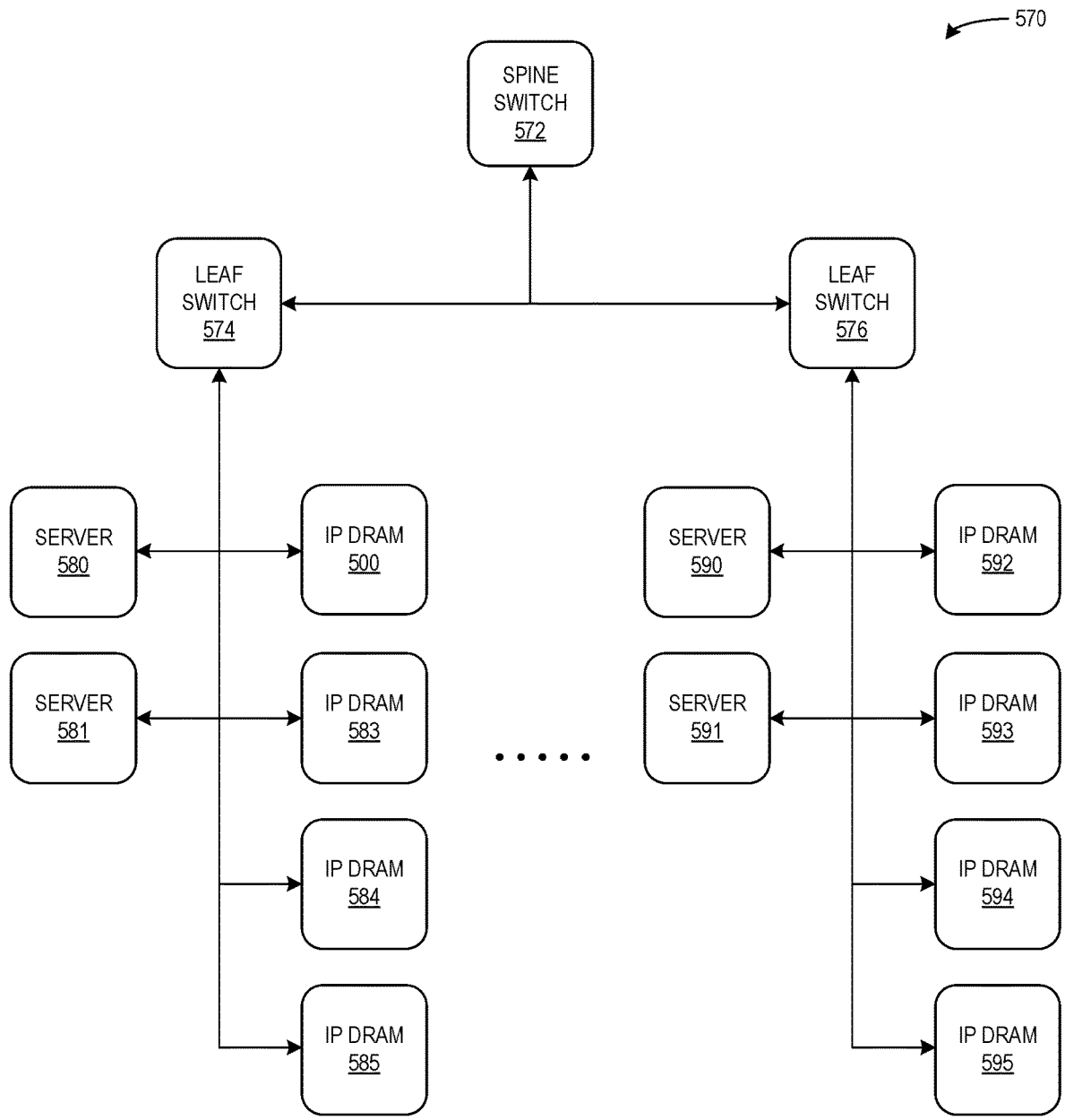
FIG. 5B illustrates an exemplary environment of Ethernet-addressable memory expansion devices accessed through switches, in accordance with an embodiment of the present application.

FIG. 5B illustrates an exemplary environment 570 of Ethernet-addressable memory expansion devices accessed through switches, in accordance with an embodiment of the present application. Environment 570 can indicate a data center deployment, and can include a spine switch 572 coupled to two leaf switches 574 and 576 (e.g., a top-of-rack or ToR switch). Leaf switch 574 can communicate with servers 580 and 581 and IP DRAMs 500, 583, 584, and 585. Leaf switch 576 can communicate with servers 590 and 591 and IP DRAMs 592, 593, 594, and 595. Environment 570 depicts how an IP DRAM (e.g., IP DRAM 500) may be accessed via a leaf switch and a spine switch. Furthermore, a server (e.g., server 580) can include a PCIe DRAM, as depicted above in relation to FIGS. 1 and 4, and the PCIe DRAM may be accessed by other servers (e.g., any of servers 581, 590, and 591) via a remote direct memory access (RDMA) protocol, as depicted above in relation to FIG. 1. The volatile memory modules (e.g., DRAM DIMM) in environment 570 include both DRAM DIMMs 510, 512, 518, and 520 of IP DRAM 500 (which are directly accessed) and the re-utilized and retired DIMMs in PCIe DRAMs 550, 552, and 554 (which are accessed as part of IP DRAM 500 over PCIe). These volatile memory modules may be accessed by multiple servers, such as any of servers 580, 581, 590, 591, or any server which can locally or remotely access these volatile memory modules.

Thus, in the embodiments described herein, memory expansion device 400 and IP DRAM 500 can efficiently re-utilize the DRAM DIMMs from retired servers. The system can effectively mitigate the degradation of used memory by providing a shared memory extension for applications, for both local and remote users. The hardware and software of the embodiments described herein include functionality for the middle-plane (e.g., IP DRAM middle plane 568), error correction (e.g., ECC encoder/decoder modules 410 and 412 of controller 460), and data placement firmware (e.g., microprocessor 408 of controller 460, and microprocessors 530-536 of IP DRAM 500). While the latency associated with accessing the memory expansion device over PCIe may be higher than the latency associated with accessing DRAM DIMM over a memory bus, accessing the memory expansion device over PCIe results in a lower latency than accessing an SSD. Furthermore, because memory access of the retired DIMMs in the memory expansion device over PCIe may be more consistent, the performance of the memory expansion device may also be more constant. Thus, by placing the retired DIMMs in the memory expansion device, the embodiments described herein can increase the efficiency and performance of the system.

Method by a Memory Expansion Device for Facilitating a Shared Memory

Figure 6A:
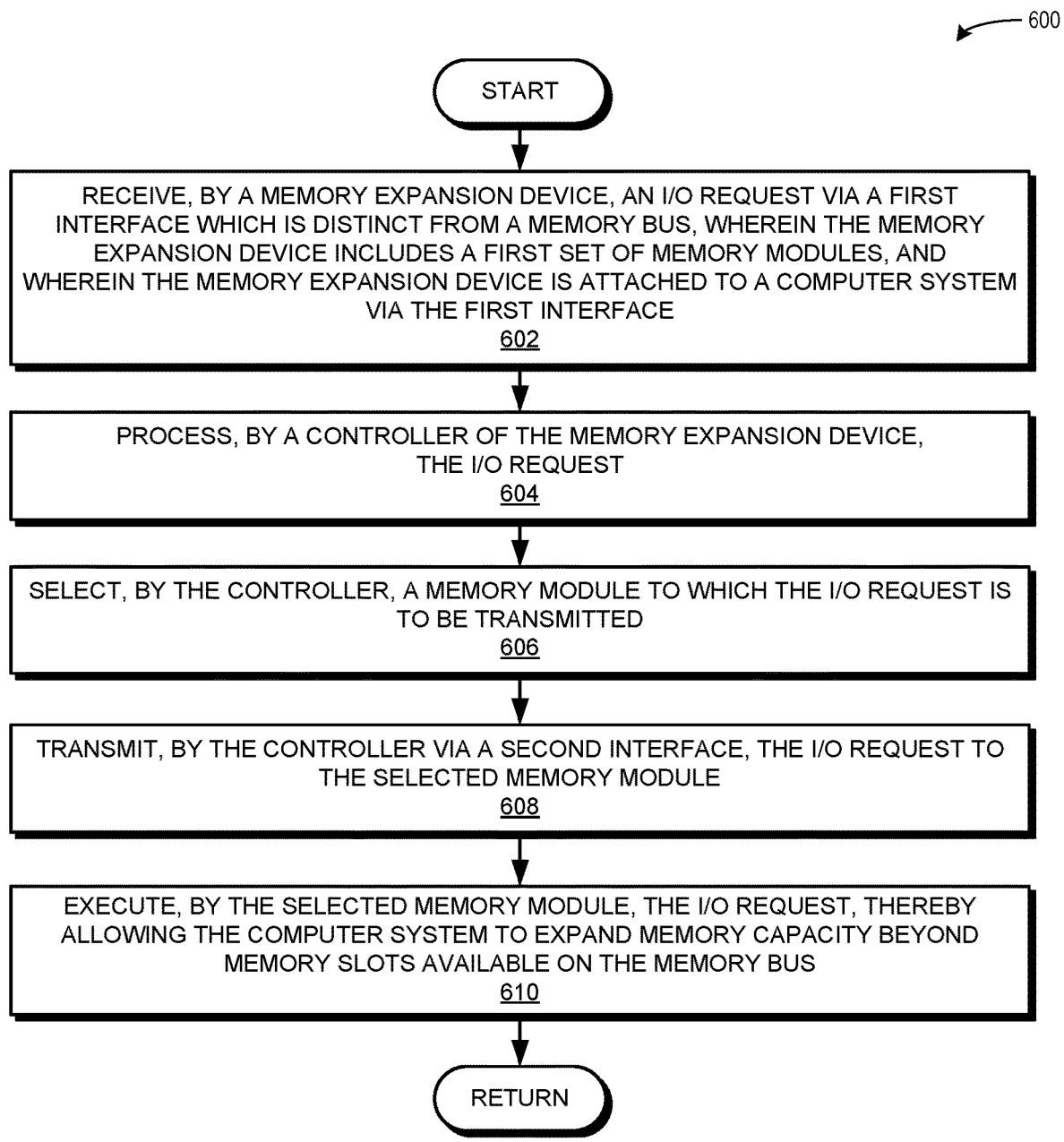
FIG. 6A presents a flowchart illustrating a method by a memory expansion device for facilitating a shared memory, in accordance with an embodiment of the present application.

FIG. 6A presents a flowchart 600 illustrating a method by a memory expansion device for facilitating a shared memory, in accordance with an embodiment of the present application. During operation, the system receives, by a memory expansion device, an I/O request via a first interface which is distinct from a memory bus, wherein the memory expansion device includes a first set of memory modules, and wherein the memory expansion device is attached to a computer system via the first interface (operation 602). The memory modules can be volatile memory modules, such as dual in-line memory modules (DIMMs). The memory expansion device can also be plugged into or coupled to the computer system via the first interface (e.g., a "pluggable" memory expansion device), and can also be fixed to the motherboard. The system processes, by a controller of the memory expansion device, the I/O request (operation 604). The system selects, by the controller, a memory module to which the I/O request is to be transmitted (operation 606). The system transmits, by the controller via a second interface, the I/O request to the selected memory module (operation 608). The system executes, by the selected memory module, the I/O request (operation 610).

Figure 6B:
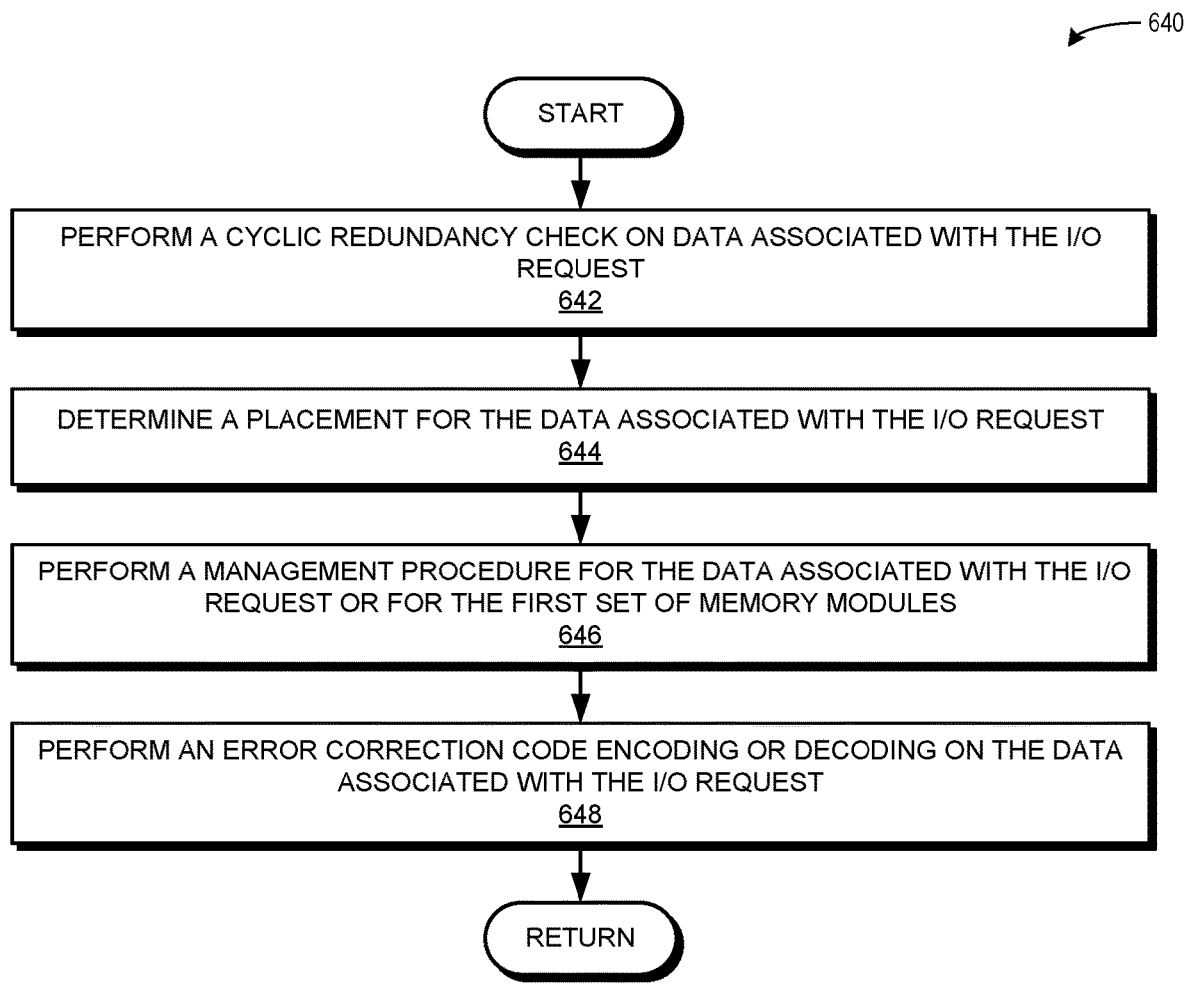
FIG. 6B presents a flowchart illustrating a method by a memory expansion device for facilitating a shared memory, in accordance with an embodiment of the present application.

FIG. 6B presents a flowchart 640 illustrating a method by a memory expansion device for facilitating a shared memory, in accordance with an embodiment of the present application. The operations depicted in flowchart 640 may be performed by a controller of a memory expansion device, such as controller 460 of memory expansion device 400 depicted in FIG. 4. During operation, the system performs a cyclic redundancy check on data associated with the I/O request (operation 642). The system determines a placement for the data associated with the I/O request (operation 644).

The system performs a management procedure for the data associated with the I/O request or for the first set of memory modules (operation 646). The system performs an error correction code encoding or decoding on the data associated with the I/O request (operation 648).

Figure 7:
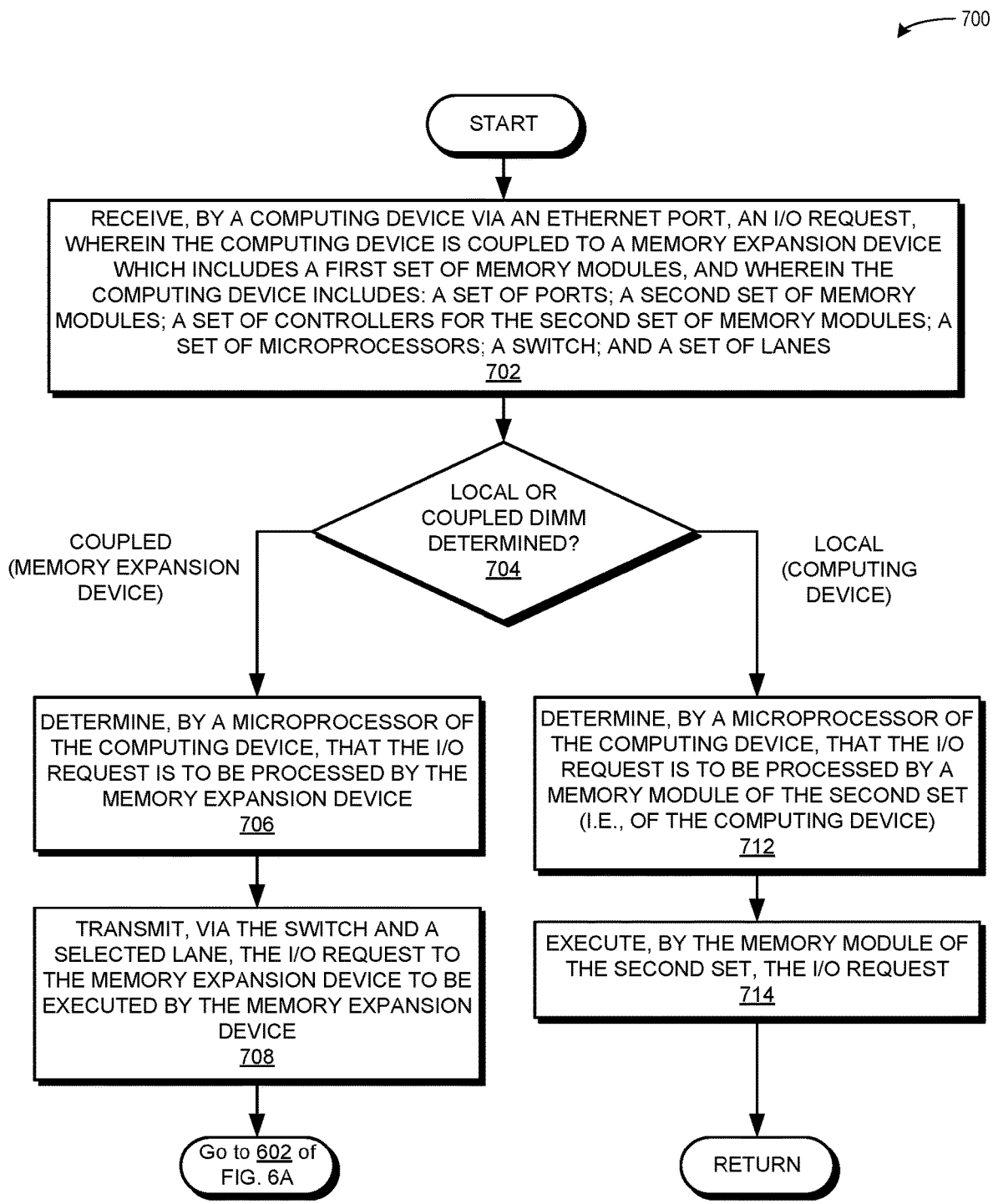
FIG. 7 presents a flowchart illustrating a method by an Ethernet-addressable memory expansion device for facilitating a shared memory, in accordance with an embodiment of the present application.

Method by an Ethernet-Addressable Memory Expansion Device for Facilitating a Shared Memory FIG. 7 presents a flowchart 700 illustrating a method by an Ethernet-addressable memory expansion device for facilitating a shared memory, in accordance with an embodiment of the present application. The Ethernet-addressable memory expansion device can be a computing device. During operation, the system receives, by a computing device via an Ethernet port, an I/O request, wherein the computing device is coupled to a memory expansion device which includes a first set of memory modules, and wherein the computing device includes: a set of ports; a second set of memory modules; a set of controllers for the second set of memory modules; a set of microprocessors; a switch; and a set of lanes (operation 702). The ports can be Ethernet ports. The system determines whether the I/O request is to be processed by a coupled memory expansion device (e.g., PCIe DRAM 550 of FIG. 5A) or by a local DRAM of the computing device (e.g., DRAM DIMM 510 of FIG. 5A) (decision 704). If the system selects the coupled memory expansion device (decision 704), the system determines, by a microprocessor of the computing device, that the I/O request is to be processed by the memory expansion device (operation 706). The system transmits, via the switch and a selected lane, the I/O request to the memory expansion device to be executed by the memory expansion device (operation 708), and the operation continues at operation 602 of FIG. 6A.

If the system selects the local DRAM (decision 704), the system determines, by a microprocessor of the computing device, that the I/O request is to be processed by a memory module of the second set (i.e., of the computing device) (operation 712). The system executes, by the memory module of the second set, the I/O request (operation 714), and the operation returns.

Exemplary Computer System

Figure 8:
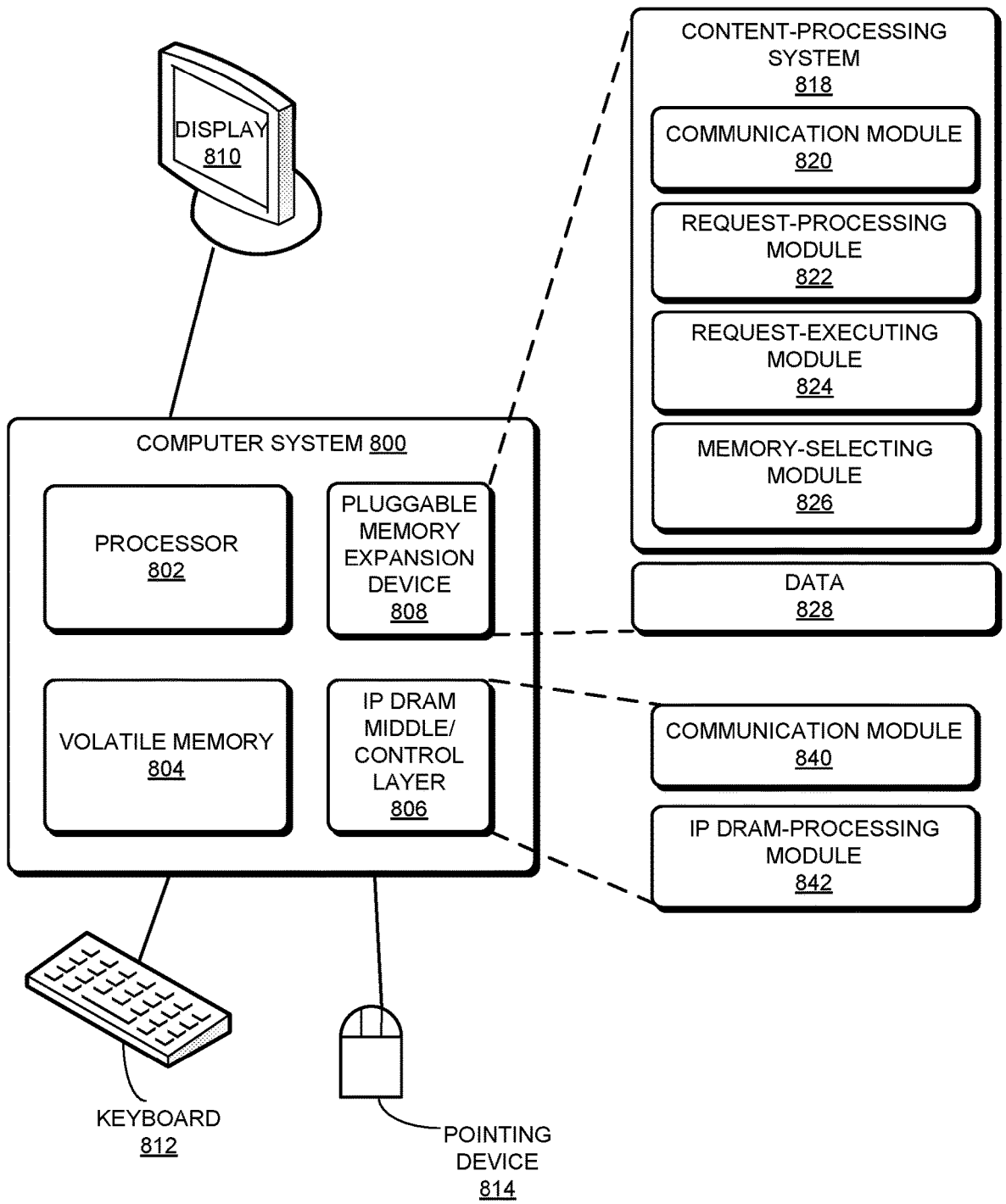
FIG. 8 illustrates an exemplary computer system that facilitates a shared memory, in accordance with an embodiment of the present application.

FIG. 8 illustrates an exemplary computer system 800 that facilitates a shared memory, in accordance with an embodiment of the present application. Computer system 800 includes a processor 802, a volatile memory 804, an IP DRAM middle/control layer 806, and a memory expansion device 808. Computer system 800 may also include non-volatile memory (not shown). Computer system 800 may be a computing device or a storage device. Volatile memory 804 can include memory (e.g., RAM) that serves as a managed memory, and can be used to store one or more memory pools. Furthermore, computer system 800 can be coupled to a display device 818, a keyboard 812, and a pointing device 814. Computer system 800 can also include an operating system (not shown). Memory expansion device 808 can store a content-processing system 818 and data 830.

Content-processing system 818 can include instructions, which when executed by computer system 800, can cause computer system 800 to perform methods and/or processes described in this disclosure. For example, content-processing system 818 can include instructions for receiving and transmitting data packets, including a request to write or read data (e.g., an I/O request), data to be encoded and stored, or a block or a page of data.

Content-processing system 818 can further include instructions for receiving, by a memory expansion device, an I/O request via a first interface which is distinct from a memory bus (communication module 820). Content-processing system 818 can include instructions for processing, by a controller of the memory expansion device, the I/O request (request-processing module 822). Content-processing system 818 can include instructions for transmitting, by the controller via a second interface, the I/O request to a selected memory module (communication module 820). Content-processing system 818 can include instructions for executing, by the selected memory module, the I/O request (request-executing module 824). Content-processing system 818 can also include instructions for selecting, by the controller, the memory module to which the I/O request is to be transmitted (memory-selecting module 826).

IP DRAM middle/control layer 806 can include instructions for receiving an I/O request (communication module 840), and for determining that the I/O request is to be processed by a memory expansion device (e.g., memory expansion device 808) (IP DRAM-processing module 842). IP DRAM middle/control layer 806 can further include instructions for transmitting, via a switch and a selected lane, the I/O request to the memory expansion device to be executed by the memory expansion device (communication module 840).

Data 828 can include any data that is required as input or that is generated as output by the methods and/or processes described in this disclosure. Specifically, data 828 can store at least: a request; an I/O request; a request which indicates data to be read or written; data to be stored, written, loaded, moved, retrieved, or copied; a block of data; a logical block address (LB A); a physical block address (PBA); a cyclic redundancy check; an error correction code encoding or decoding; a data placement; a management procedure for data or a volatile memory module; an indicator of an interface, a PCIe interface, or a DRAM DIMM interface; and an indicator or identifier of a port, a controller, a microprocessor, a switch, or a lane.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating a shared memory, the method comprising:
   receiving, by a computing device, an I/O request, wherein a plurality of memory expansion devices are fixed to a motherboard of the computing device, wherein a first memory expansion device includes a first set of memory modules and further includes a first interface which is distinct from a memory bus;
   determining, by a microprocessor of the computing device, whether the I/O request is to be processed by the first memory expansion device or by a memory module of the computing device; and
   in response to determining that the I/O request is to be processed by the first memory expansion device:
      transmitting, by the computing device to the first memory expansion device, via the first interface of the first memory expansion device, the I/O request to be executed by the first memory expansion device;
      processing, by a controller of the first memory expansion device, the I/O request, which involves performing a cyclic redundancy check, a data placement procedure, a volatile memory management procedure, and an error correction code encoding on the data associated with the I/O request to obtain processed data;
      transmitting, by the controller via a second interface of the first memory expansion device, the I/O request including the processed data to a selected memory module of the first set of memory modules; and
      executing, by the selected memory module, the I/O request, based on the processed data, thereby allowing the computer system to expand memory capacity beyond memory slots available on the memory bus.

2. The method of claim 1, further comprising:
   selecting, by the controller, the first memory expansion device to which the I/O request is to be transmitted.

3. The method of claim 1, wherein processing the I/O request further comprises:
   performing a management procedure for the first set of memory modules.

4. The method of claim 1, wherein the first interface is a Peripheral Component Interconnect Express (PCIe) interface between a requesting host and the controller, and
   wherein the second interface is a dynamic random access memory (DRAM) dual in-line memory module (DIMM) interface between the controller and the memory modules.

5. The method of claim 1, wherein the first memory expansion device is coupled to the computing device, which includes:
   a set of ports;
   a second set of memory modules;
   a set of controllers for the second set of memory modules;
   a set of microprocessors;
   a switch; and
   a set of lanes.

6. The method of claim 5, wherein prior to the first memory expansion device receiving the I/O request, the method further comprises:
   receiving, by the computing device via a port, the I/O request;

determining, by a microprocessor of the computing device, that the I/O request is to be processed by the first memory expansion device; and transmitting, via the switch and a selected lane, the I/O request to the first memory expansion device to be executed by the first memory expansion device.

7. The method of claim 1, wherein the plurality of memory expansion devices attached to or coupled to the computing device.

8. The method of claim 5, further comprising:

receiving, by the computing device via a port, a second I/O request;

determining, by a microprocessor of the computing device, that the second I/O request is to be processed by a memory module of the second set of memory modules; and executing, by the memory module of the second set of memory modules, the second I/O request.

9. A memory expansion device for facilitating a shared memory, the memory expansion device comprising:

a first interface which is distinct from a memory bus, wherein the memory expansion device is fixed to a motherboard of a computing device via the first interface;

control circuitry;

a second interface; and a first set of memory modules coupled to the control circuitry via the second interface;

wherein the control circuitry is configured to:

receive, via the first interface, an I/O request;

process the I/O request, which involves performing a cyclic redundancy check, a data placement procedure, a volatile memory management procedure, and an error correction code encoding on the data associated with the I/O request to obtain processed data; and transmit, via the second interface, the I/O request including the processed data to a selected memory module of the first set of memory modules, wherein prior to the control circuitry receiving the I/O request, a microprocessor of the computing device is configured to:

determine whether the I/O request is to be processed by the memory expansion device or by a memory module of the computing device; and in response to determining that the I/O request is to be processed by the memory expansion device, transmit the I/O request to the control circuitry to be executed by the memory expansion device; and wherein the selected memory module is configured to execute, based on the processed data, the I/O request, thereby allowing the computing device to expand memory capacity beyond memory slots available on the memory bus.

10. The memory expansion device of claim 9, wherein the control circuitry is further configured to:

select the memory module to which the I/O request is to be transmitted.

11. The memory expansion device of claim 9, wherein in processing the I/O request, the control circuitry is further configured to:

performing a management procedure for the first set of memory modules.

12. The memory expansion device of claim 9, wherein the first interface is a Peripheral Component Interconnect Express (PCIe) interface between a requesting host and the controller, and wherein the second interface is a dynamic random access memory (DRAM) dual in-line memory module (DIMM) interface between the controller and the memory modules.

13. The memory expansion device of claim 9, wherein the memory expansion device is coupled to a computing device which includes:

a set of ports;

a second set of memory modules;

a set of controllers for the second set of memory modules;

a set of microprocessors;

a switch; and a set of lanes.

14. The memory expansion device of claim 13, wherein prior to the control circuitry receiving the I/O request:

the microprocessor of the computing device is further configured to receive, via a port, the I/O request and transmit, via the switch and a selected lane, the I/O request to the memory expansion device to be executed by the memory expansion device.

15. The memory expansion device of claim 13, wherein the memory expansion device is one of a plurality of memory expansion devices attached to or coupled to the computing device.

16. The memory expansion device of claim 13, wherein the computing device is further configured to:

receive, via a port, a second I/O request;

wherein the microprocessor of the computing device is further configured to determine that the second I/O request is to be processed by a memory module of the second set of memory modules; and wherein the memory module of the second set of memory modules is configured to execute the second I/O request.

17. A computer system for facilitating a shared memory, the system comprising:

a processor;

a volatile memory; and a memory expansion device which is fixed to a motherboard of the computer system, includes a first set of memory modules and further includes a first interface which is distinct from a memory bus:

a first communication module configured to receive an I/O request via the first interface;

a request-processing module configured to process the I/O request, which involves performing a cyclic redundancy check, a data placement procedure, a volatile memory management procedure, and an error correction code encoding or decoding on the data associated with the I/O request to obtain processed data;

a memory-selecting module configured to select a memory module to which the I/O request is to be sent, wherein the first communication module is further configured to transmit, via a second interface, the I/O request including the processed data to the selected memory module; and wherein prior to the first communication module receiving the I/O request, the computing system further includes an IP DRAM control layer, which includes:

a second communication module configured to receive, via a port, the I/O request;

determine whether the I/O request is to be processed by the memory expansion device or by a memory module of the computer system; and wherein the second communication module is further configured to, in response to determining by an IP DRAM-processing module that the I/O request is to be processed by the memory expansion device, transmit the I/O request to the first communication module to be executed by the memory expansion device; and a request-executing module configured to execute, by the selected memory module, the I/O request, based on the processed data, thereby allowing the computer system to expand memory capacity beyond memory slots available on the memory bus.

18. The computer system of claim 17, wherein the request-processing module is further configured to:

performing a management procedure for the first set of memory modules.

19. The computer system of claim 17, wherein the memory expansion device is coupled to a computing device which includes:

a set of ports;
a second set of memory modules;
a set of controllers for the second set of memory modules;
a set of microprocessors;
a switch; and
a set of lanes.

20. The computer system of claim 19, wherein the second communication module of the IP DRAM layer is further configured to transmit, via the switch and a selected lane, the I/O request to the memory expansion device to be executed by the memory expansion device.

* * * * *